US012677932B1

(12) United States Patent　　　　(10) Patent No.:　US 12,677,932 B1
McDonald　　　　　　　　　　　　　　(45) Date of Patent:　　Jul. 14, 2026

(54) SPINDLE BRUSH

(71) Applicant: RevHD LLC, Franklin, TN (US)

(72) Inventor: Sean McDonald, Nashville, TN (US)

(73) Assignee: RevHD LLC, LaVergne, TN (US)

( * ) Notice: Subject to any disclaimer, the term of this patent is extended or adjusted under 35 U.S.C. 154(b) by 65 days.

(21) Appl. No.: 18/938,505

(22) Filed: Nov. 6, 2024

Related U.S. Application Data

(60) Provisional application No. 63/547,680, filed on Nov. 7, 2023.

(51) Int. Cl.
　*A46B 9/02*　　　(2006.01)
　*A46B 5/02*　　　(2006.01)
　*A46B 7/04*　　　(2006.01)
　*B60S 3/04*　　　(2006.01)
(52) U.S. Cl.
　CPC .............. *A46B 9/026* (2013.01); *A46B 5/021* (2013.01); *A46B 7/04* (2013.01); *A46B 2200/3046* (2013.01); *A46B 2200/3093* (2013.01); *B60S 3/045* (2013.01)
(58) Field of Classification Search
　None
　See application file for complete search history.

(56)　　　　References Cited

U.S. PATENT DOCUMENTS 3,066,346 A * 12/1962 Hofstra .................... A46B 9/02
　　　　　　　　　　　　　　　　　　　　401/184
2009/0056748 A1 * 3/2009 Wales ..................... A47L 13/34
　　　　　　　　　　　　　　　　　　　　15/104.94

OTHER PUBLICATIONS

Robotec, 4-in-1 Pipe Fitting Brush, available at https://www.homedepot.com/p/Robtec-4-in-1-Pipe-Fitting- Brush-37003000/306940337 (last accessed Nov. 7, 2024), 5 pages.
Kwalitistar, [3-Size Set] Copper Pipe Cleaner for Drill, Clean ½, ¾, 1-in Copper Pipes & Tubes for Soldering, 3 Tube Cleaning Brushes, Model InerLok050, 075, 100, w/ Stainless-Steel Wire Bristles & ¼" Shank, available at https://www.amazon.com/Soldering-Cleaning-InerLok050-Stainless-Steel-Bristles/dp/B0D9PX5HZD/ref=sr_1_1?crid=3NLCL1M6UH2LM&dib=eyJ2ljoiMSJ9.rLKrlv9hMhewzbswnk_3wcuxzBYxCFGWXtZvknYKhijefRiegilIBNFA886K0R01SUJT86MarqoaDE04_76SWNa-5pSaG, 10 pages, filed Nov. 7, 2024.

* cited by examiner

*Primary Examiner* — Eric W Golightly

(74) *Attorney, Agent, or Firm* — Shane Cortesi

(57)　　　　　　ABSTRACT

The present disclosure provides spindle brushes and methods of using the same. The spindle brush may comprise a plurality of bristles located in a generally cylindrical cavity and handles located laterally relative to the bristles. The spindle brush may also include a smooth interior wall to the rear of the bristles to confirm that debris has been removed from the spindle.

12 Claims, 8 Drawing Sheets

SPINDLE BRUSH

BACKGROUND

Technical Field

The present invention relates to brushes for cleaning spindles of tractor trailers and other vehicles.

Background of the Invention

Spindles of tractor trailers accumulate dirt and other debris.

Accordingly, there is a need for removing dirt and other debris from spindles, particularly shoulders of spindles.

SUMMARY OF THE INVENTION

The present invention relates to spindle brushes.

BRIEF DESCRIPTION OF THE DRAWINGS

FIG. 4 illustrates a front, top, exploded perspective view of the spindle brush of FIG. 1.

FIG. 5 illustrates a rear, top, exploded perspective view of the spindle brush of FIG. 1.

DETAILED DESCRIPTION

Figure 1:
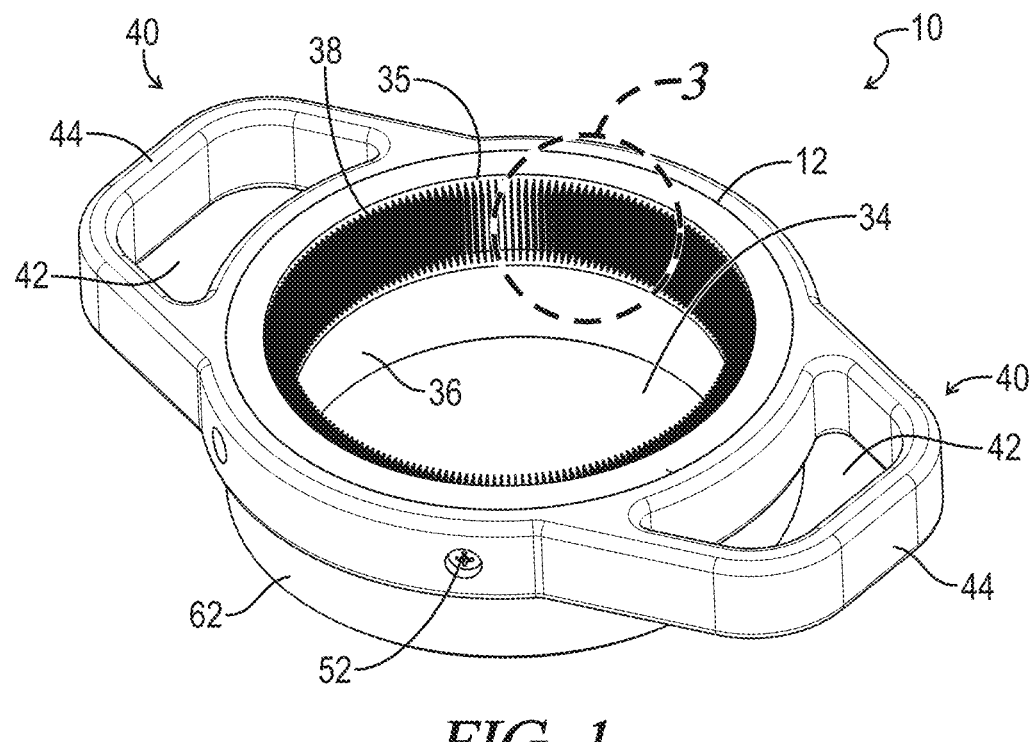
FIG. 1 illustrates a front, top perspective view of a spindle brush of one embodiment of the present invention.
Figure 2:
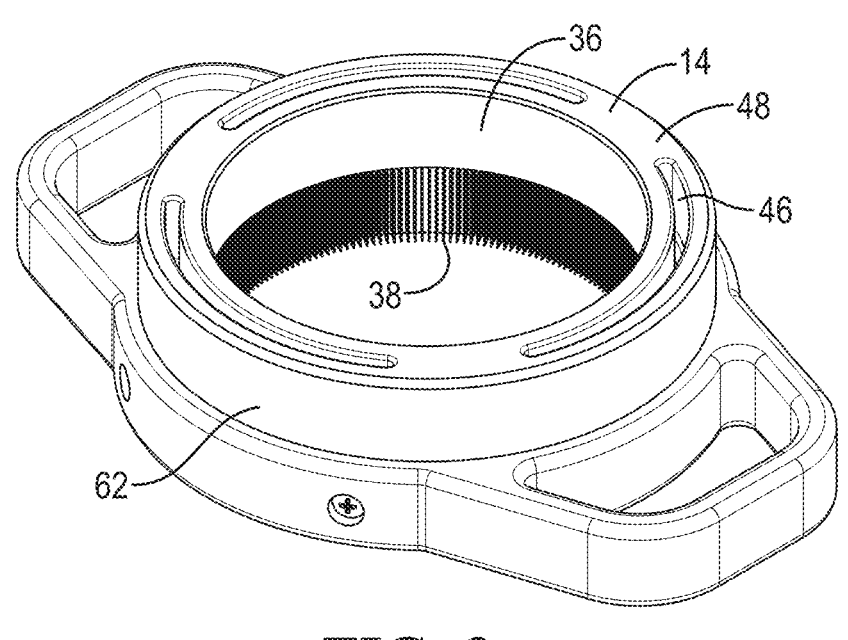
FIG. 2 illustrates a rear, top perspective view of the spindle brush of FIG. 1.

With reference to FIGS. 1-16, the present disclosure provides a spindle brush and use of the same. In the drawings, not all reference numbers are included in each of the drawings for the sake of clarity. FIGS. 1-16 are CAD drawings drawn to scale; however, it will be appreciated that other dimensions are possible.

Figure 3:
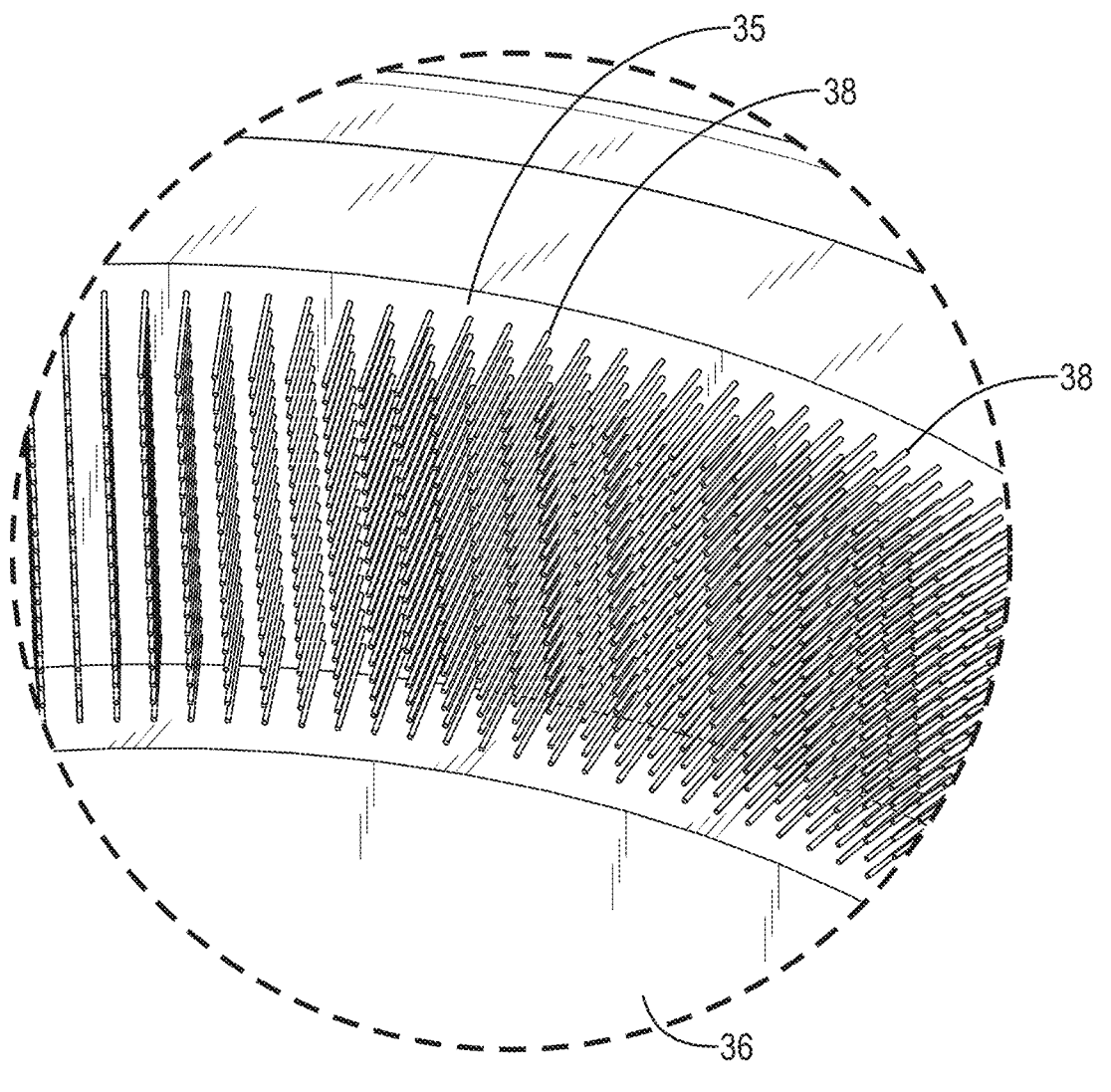
FIG. 3 illustrates a view of the circled area labelled 3 in FIG. 1.
Figures 6, 7, 8:
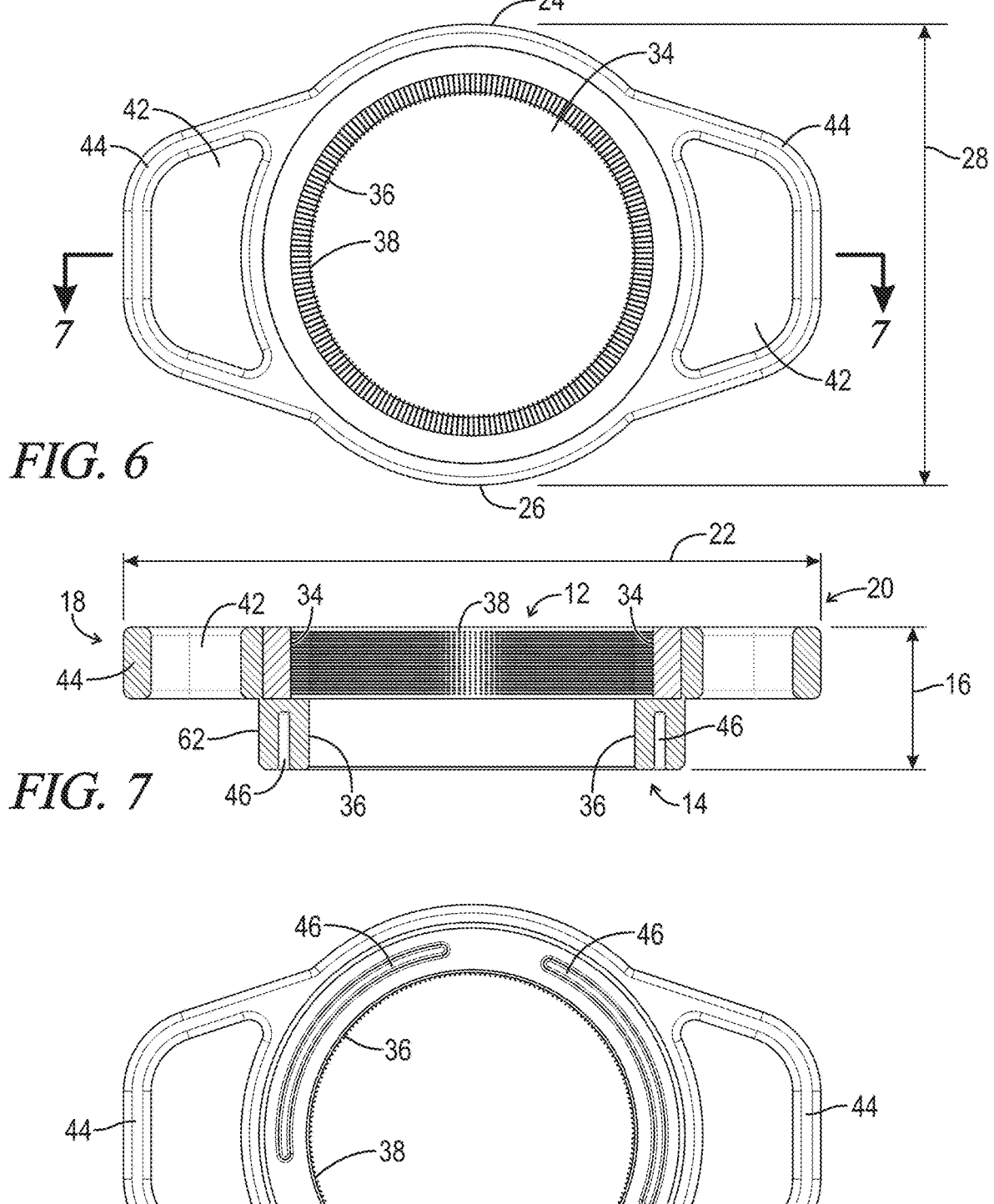
FIG. 6 illustrates a front plan view of the spindle brush of FIG. 1.
FIG. 7 illustrates a sectional view of the spindle brush of FIG. 1, taken along line 7-7 of FIG. 6.
FIG. 8 illustrates a rear plan view of the spindle brush of FIG. 1.
Figure 9:
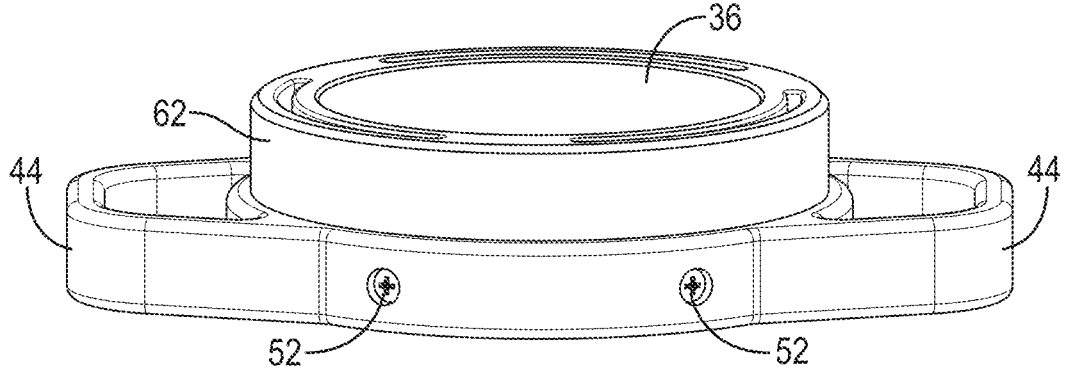
FIG. 9 illustrates a top elevation view of the spindle brush of FIG. 1, with the spindle brush being inverted so that the front is below the rear.
Figure 10:
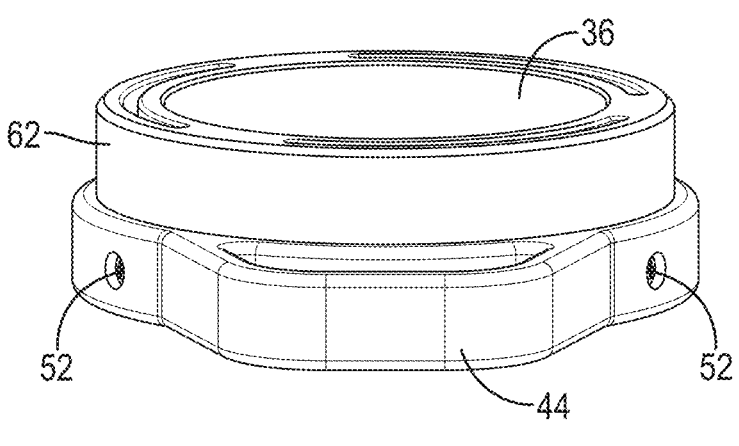
FIG. 10 illustrates a side perspective view of the spindle brush of FIG. 1, with the spindle brush being inverted so that the front is below the rear.

Referring further to FIGS. 1-16, in some embodiments, the present disclosure provides a spindle brush 10 that comprises one or more of the following: a brush body comprising a front 12, a rear 14, a thickness 16 extending from the front 12 to the rear 14, a left side 18, a right side 20, a width 22 extending from the left side 18 to the right side 20 and perpendicular to the thickness 16, a top 24, a bottom 26, a height 28 extending from the top 24 to the bottom 26 and perpendicular to the thickness 16 and the width 22, at least one generally cylindrical wall 30 comprising an interior surface 32 defining/surrounding a generally cylindrical cleaning cavity 34. Optionally, the generally cylindrical cleaning cavity 34 is hollow and extends from the brush body front 12 to the brush body rear 14. Optionally, the at least one generally cylindrical wall interior surface 32 comprises a forward segment 35 comprising a plurality of bristles 38. Optionally, as best seen in FIG. 3, the plurality of bristles 38 are arranged in rows that are spaced about a circumference of the forward segment 35 of the generally cylindrical wall interior surface 32. Optionally, as best seen in FIG. 3, the plurality of bristles 38 are also arranged in columns that are parallel to the brush body thickness 16 and perpendicular to the rows. Optionally, the rows are spaced approximately evenly apart. Optionally, the columns are spaced approximately evenly apart. Optionally, each bristle 38 extends from the forward segment 35 of the generally cylindrical wall interior surface 32 towards the generally cylindrical cleaning cavity 34.

The spindle brush 10 may be any suitable dimension. Preferred dimensions for the body width 22 are between about 8 inches and about 12 inches. Preferably, the generally cylindrical cleaning cavity 34 has a width of from about 4 inches to about 6 inches.

Optionally, as shown in the illustrations, the spindle brush 10 further comprises a pair of handles 40 located laterally relative to the generally cylindrical cleaning cavity 34 on the brush body left side 18 and the brush body right side 20. Optionally, the at least one generally cylindrical wall interior surface 32 further comprises a rear segment 36 located to the rear of the forward segment 35, the rear segment 36 being generally smooth/flat/lacking bristles 38. Optionally, if included, the handles 40 each comprise a handle hole 42 configured to receive fingers of a human and a handle wall 44 extending around the handle hole 42, which allow the user to wrap his or her fingers around the handle wall 44.

Optionally, as shown in the illustrations, if a rear segment 36 is included, the thickness of the forward segment 35 (as measured from the front to the rear of the forward segment 35) is approximately equal to the thickness of the rear segment 36 (as measured from the front to the rear of the rear segment). Optionally, the bristles 38 jut/extend slightly further interior into the generally cylindrical cleaning cavity 34 as compared to the rear segment 36 of the at least one generally cylindrical wall interior surface 32.

Figures 4, 5:
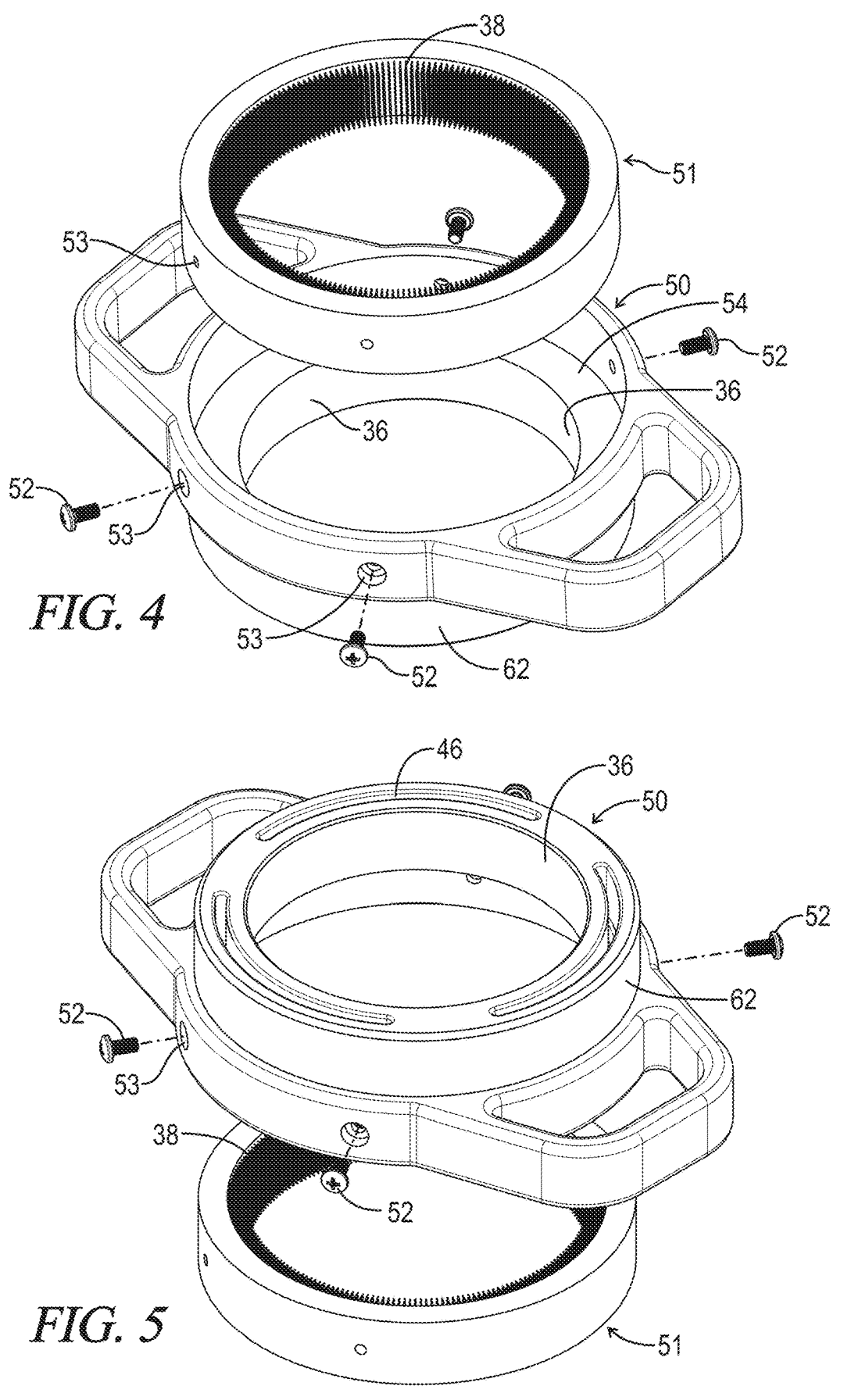

Optionally, as best seen in FIGS. 4-5, the brush body is comprised of a main (preferably plastic) body 50 and a removable (preferably metal) insert 51 comprising the bristles 38. Optionally, the removable insert 51 is attached to the main body 50 by one or more fasteners 52 that extend through fastener holes 53 located in the main body 50 and removable insert 51. Optionally, the brush body comprises a generally circular ledge 54, and the removable insert 51 rests on the generally circular ledge 54.

Figure 11:
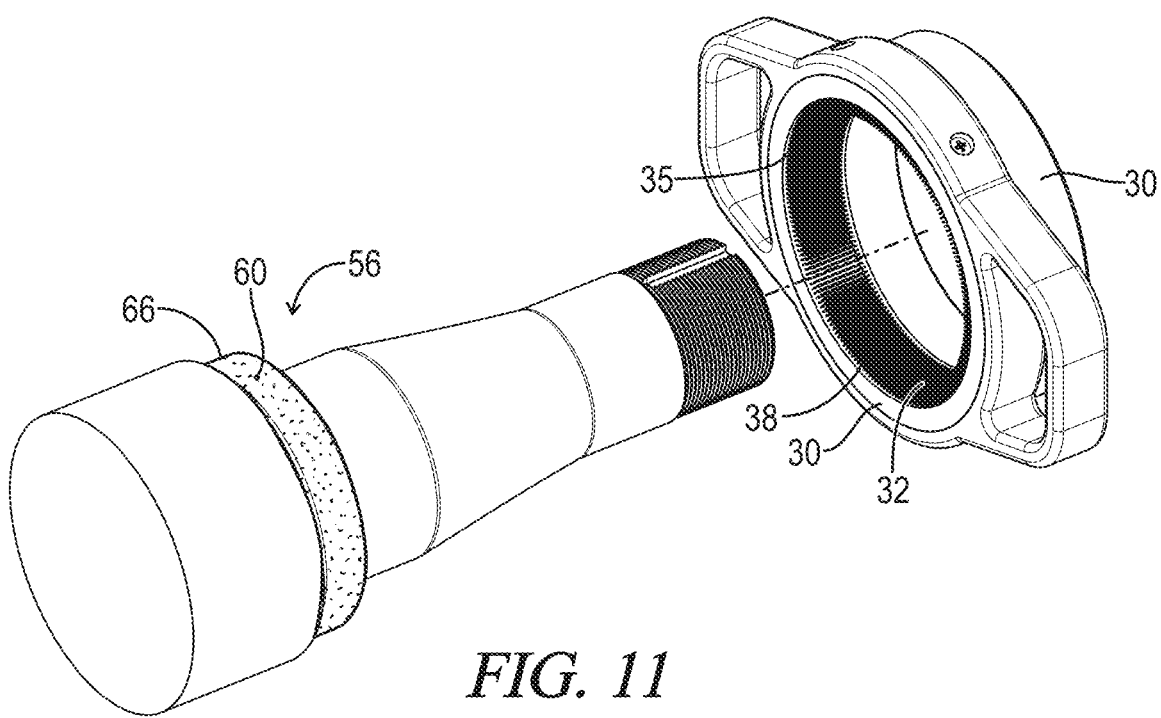
FIG. 11 illustrates a front perspective view of the spindle brush of FIG. 1 prior to cleaning a spindle.
Figure 12:
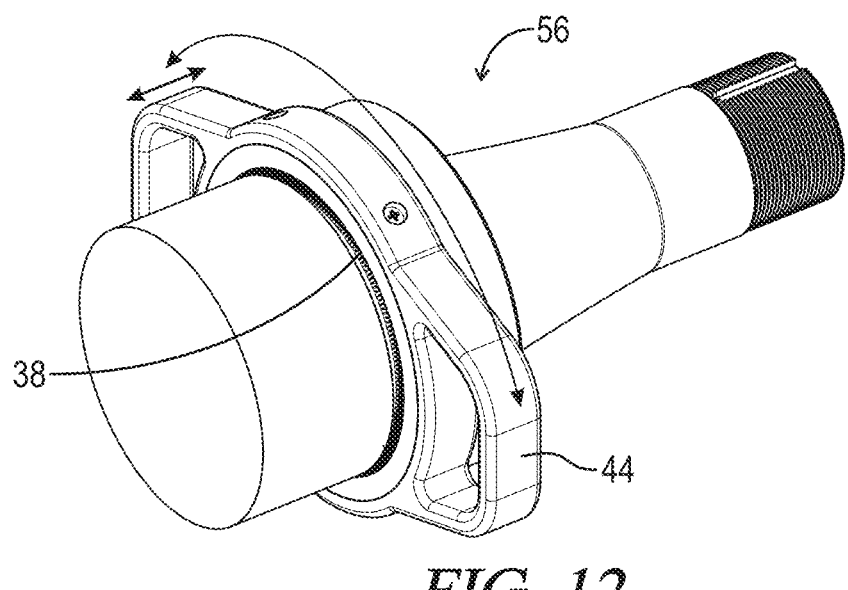
FIG. 12 illustrates a front perspective view of the spindle brush of FIG. 1 cleaning the spindle of FIG. 11.
Figure 13:
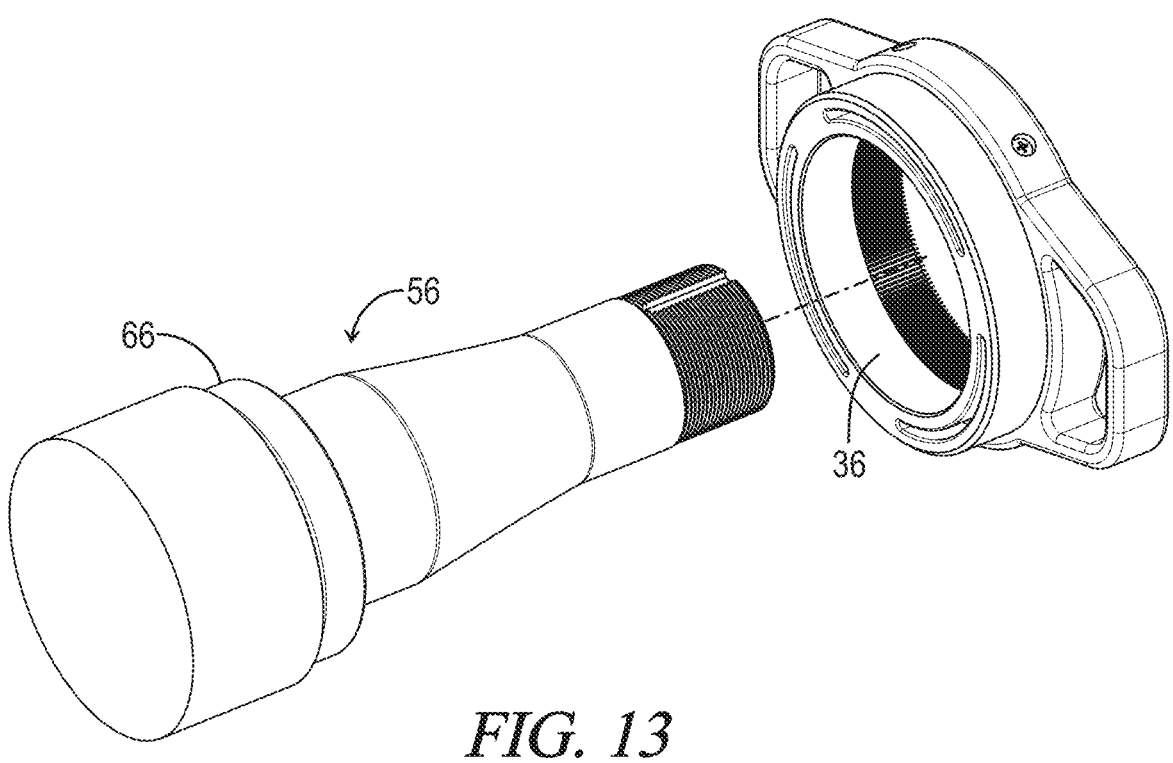
FIG. 13 illustrates a front perspective view of the spindle brush of FIG. 1 after cleaning the spindle of FIG. 11.
Figure 14:
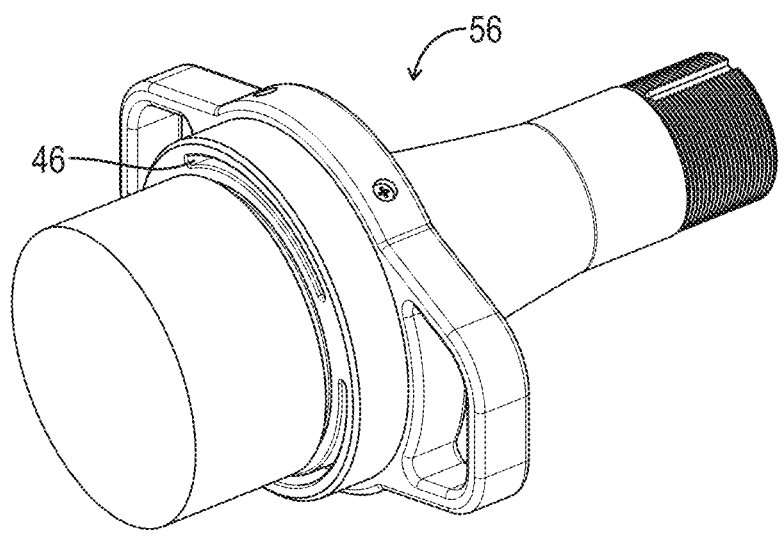
FIG. 14 illustrates a rear perspective view of the spindle brush of FIG. 1 checking the cleanliness of the spindle of FIG. 11.

Optionally, as seen in FIGS. 11-12, the spindle brush 10 is used in a method that comprises one or more of the following steps: a) providing the spindle brush 10; b) placing the brush body rear 14 directly in front of the spindle 56; c) moving the brush body forwardly to place the spindle 56 in the generally cylindrical cleaning cavity 34, and d) moving the brush body forwardly and rearwardly and/or rotating the brush body relative to the spindle to clean the spindle 56 (e.g., remove debris 60 from the shoulder of the spindle 66) with the bristles 38. Typically, prior to cleaning, the user will remove the bearings and other components (e.g., hub, hubcap, locknut, spacer) 58 from the spindle 56. Optionally, as shown in FIGS. 13-14, the method further comprises: e) inverting the brush body (i.e., placing the brush body rear 14 directly in front of the spindle 56); f) moving the rear segment 14 over the spindle 56 so that it surrounds the spindle 56. Without being bound by any particular theory, steps e and f may be used to determine whether the spindle 56 is clean). In such embodiments, the rear segment 14 has an inner diameter that is approximately equal to the outer diameter of the spindle shoulder 66 so the spindle brush 10 functions as a go/no go gauge.

Optionally, the method further comprises using the handle 40 to hold the spindle brush 10 by, for example, wrapping the fingers of a human's left and right hands around the handle walls 44 to grip the spindle brush 10.

Optionally, the brush body further comprises a plurality of arc-shaped recesses/slots/holes 46 located on the brush body front 12 and located laterally relative to the generally cylindrical cleaning cavity 34. Optionally, the plurality of arc-shaped recesses/slots/holes 46 are spaced around a circumference of a rear surface 48 of the at least one generally cylindrical wall 30. Optionally, the plurality of arc-shaped recesses/slots/holes 46 comprises three arc-shaped recesses/slots/holes spaced evenly apart 46. Without being bound by any particular theory, the arc-shaped recesses/slots/holes 46 may be present to reduce the weight of the brush body.

Figure 15:
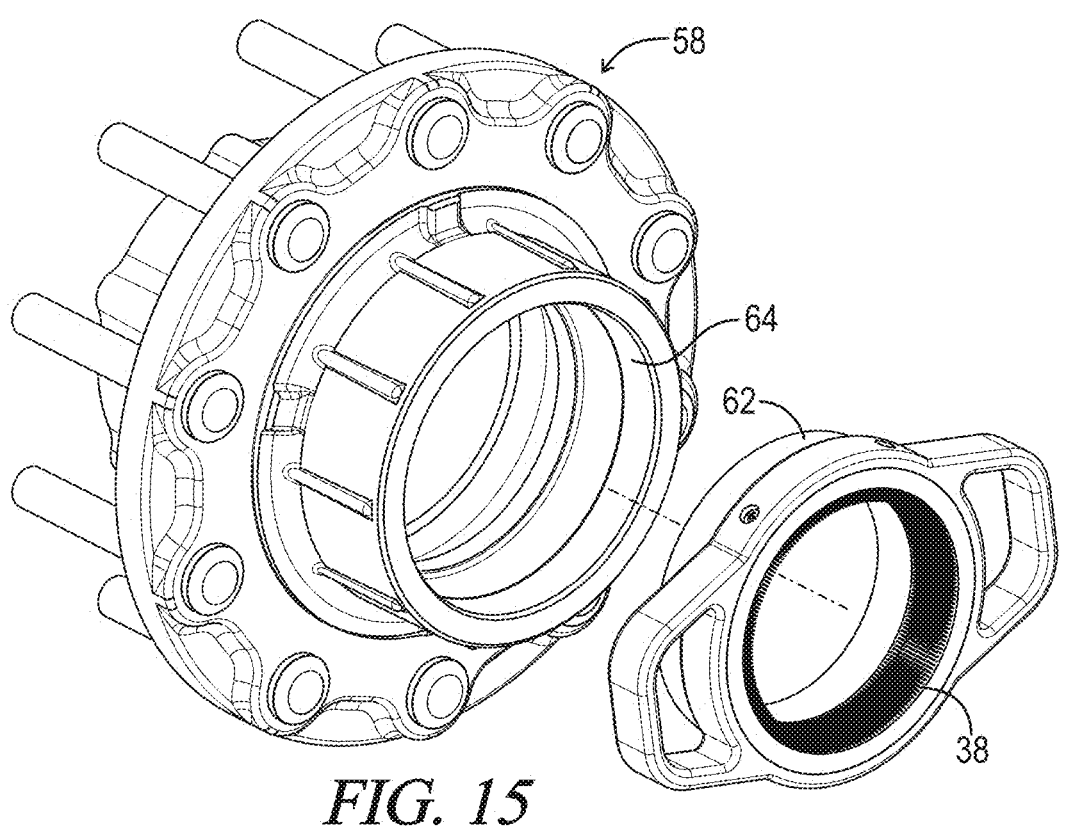
FIG. 15 illustrates a rear perspective view of the spindle brush of FIG. 1 checking the cleanliness and depth of a hub of a truck/trailer wheel hub assembly.
Figure 16:
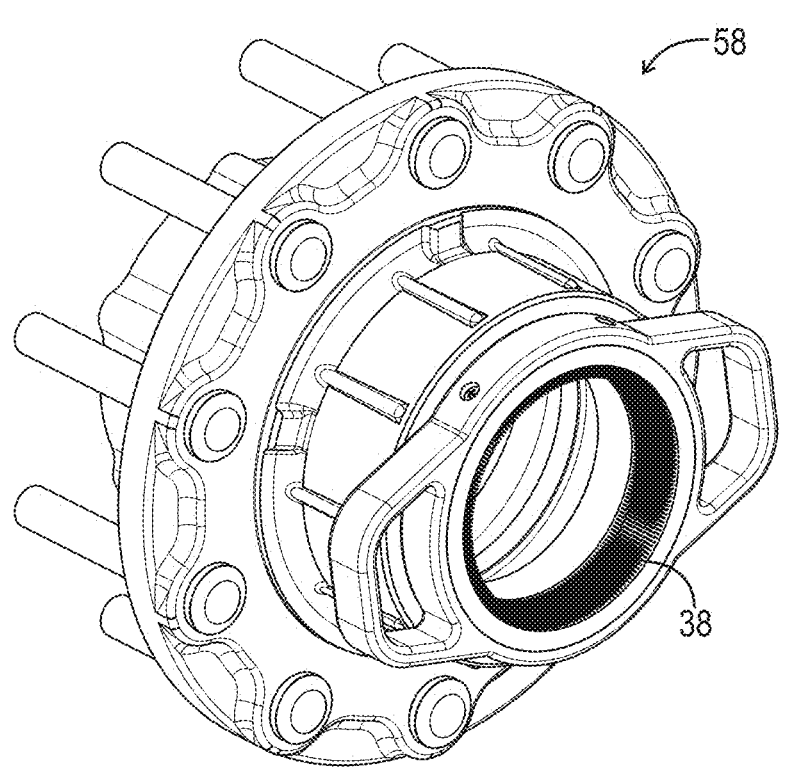
FIG. 16 illustrates a rear perspective view of the spindle brush of FIG. 1 checking the cleanliness of the hub of the truck/trailer wheel hub assembly of FIG. 15.

Optionally, as shown in FIGS. 15-16, the spindle brush 10 is used as a go/no go gauge for a hub 58 comprising a bore 64 that mounts to the spindle 56. More particularly, the at least one generally cylindrical wall 30 may comprise an exterior surface 62 opposite the interior surface of the rear segment 36, and the method may further comprise placing the exterior surface 62 against the hub bore 64 (preferably without the hub 58 mounted to/installed on the spindle 56) to determine if the hub bore 64 is out of round and/or is appropriately deep. In such embodiments, the hub bore 64 has an inner diameter that is approximately equal to the outer diameter of the exterior surface so that the spindle brush 10 functions as a go/no go gauge.

Any features described herein may be used individually or in any desired combination.

| Part List | |
| --- | --- |
| Spindle Brush | 10 |
| Brush Body Front | 12 |
| Brush Body Rear | 14 |
| Brush Body Thickness | 16 |
| Brush Body Left Side | 18 |
| Brush Body Right Side | 20 |
| Brush Body Width | 22 |
| Brush Body Top | 24 |
| Brush Body Bottom | 26 |
| Brush Body Height | 28 |
| Cylindrical Wall | 30 |
| Wall Interior Surface | 32 |
| Cylindrical Cleaning Cavity | 34 |
| Wall Interior Surface Forward Segment | 35 |
| Wall Interior Surface Rear Segment | 36 |

-continued

| Part List | |
| --- | --- |
| Bristles | 38 |
| Handle | 40 |
| Handle Hole | 42 |
| Handle Wall | 44 |
| Arc-shaped Recesses | 46 |
| Wall Rear Surface | 48 |
| Main Body | 50 |
| Insert | 51 |
| Fasteners | 52 |
| Fastener holes | 53 |
| Ledge | 54 |
| Spindle | 56 |
| Hub Assembly | 58 |
| Debris | 60 |
| Exterior surface of at least one generally cylindrical wall opposite rear segment | 62 |
| Hub Bore | 64 |
| Spindle Shoulder | 66 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A spindle brush comprising:
a brush body comprising a front, a rear, a thickness extending from the front to the rear, a left side, a right side, a width extending from the left side to the right side and perpendicular to the thickness, a top, a bottom, a height extending from the top to the bottom and perpendicular to the thickness and the width, at least one generally cylindrical wall comprising an interior surface defining a generally cylindrical cleaning cavity, the generally cylindrical cleaning cavity being hollow and extending from the brush body front to the brush body rear, the at least one generally cylindrical wall interior surface comprising a forward segment comprising a plurality of bristles, said bristles arranged in rows that are spaced about a circumference of the forward segment of the generally cylindrical wall interior surface, each bristle extending from the generally cylindrical wall interior surface towards the generally cylindrical cleaning cavity,
wherein the brush body comprises a pair of handles located laterally relative to the generally cylindrical cleaning cavity on the brush body left side and the brush body right side, the handles each comprising a handle hole configured to receive fingers of a human and a handle wall extending around the handle hole; and further
wherein the at least one generally cylindrical wall interior surface further comprises a rear segment located to the rear of the forward segment, the rear segment being generally smooth and lacking bristles.

2. The spindle brush of claim 1 wherein said bristles are wire bristles.

3. The spindle brush of claim 1 wherein the plurality of bristles are also arranged in columns that are parallel to the brush body thickness and perpendicular to the rows.

4. The spindle brush of claim 3, wherein the rows are spaced approximately evenly apart, and the columns are spaced approximately evenly apart.

5. The spindle brush of claim 1, wherein the thickness of the forward segment, as measured from the front to the rear of the forward segment, is approximately equal to the thickness of the rear segment, as measured from the front to the rear of the rear segment.

6. The spindle brush of claim 1 wherein the bristles jut/extend slightly further interior into the generally cylindrical cleaning cavity as compared to the rear segment of the at least one generally cylindrical wall interior surface.

7. The spindle brush of claim 1 wherein the brush body is comprised of a main body and a removable insert comprising the bristles, the removable insert attached to the main body by one or more fasteners.

8. The spindle brush of claim 7 wherein the brush body comprises a ledge and further wherein the removable insert rests on the ledge.

9. A method of cleaning a spindle comprising:
a) providing the spindle brush of claim 1;
b) placing the brush body rear directly in front of the spindle;
c) moving the brush body forwardly to place the spindle in the generally cylindrical cleaning cavity, and
d) moving the brush body forwardly and rearwardly and/or rotating the brush body relative to the spindle to clean the spindle with the bristles.

10. The method of claim 9, wherein the method further comprises:
e) inverting the brush body;
f) moving the rear segment over the spindle so that it surrounds the spindle.

11. The method of claim 10 wherein the at least one generally cylindrical wall comprises an exterior surface opposite the interior surface of the rear segment, and wherein the method further comprises placing the exterior surface against a hub bore of a hub configured to mount to the spindle to determine if the hub bore is out of round and sufficiently deep.

12. The method of claim 9 wherein the method further comprises wrapping the fingers of a human's hand around the handle walls to grip the spindle brush.

* * * * *